United States Patent
Fajtl

(10) Patent No.: US 9,537,391 B2
(45) Date of Patent: Jan. 3, 2017

(54) VOLTAGE REGULATION OF A DC/DC CONVERTER

(75) Inventor: Stéphanie Fajtl, Voiron (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 924 days.

(21) Appl. No.: 13/578,626

(22) PCT Filed: Feb. 8, 2011

(86) PCT No.: PCT/EP2011/051777
§ 371 (c)(1),
(2), (4) Date: Aug. 12, 2012

(87) PCT Pub. No.: WO2011/098435
PCT Pub. Date: Aug. 18, 2011

(65) Prior Publication Data
US 2012/0306278 A1    Dec. 6, 2012

(30) Foreign Application Priority Data

Feb. 12, 2010 (EP) .................................. 10290070
Aug. 3, 2010 (EP) .................................. 10171796

(51) Int. Cl.
| | | |
|---|---|---|
| H02M 3/156 | (2006.01) | |
| H02M 3/02 | (2006.01) | |
| H02M 3/157 | (2006.01) | |
| H02M 5/42 | (2006.01) | |

(52) U.S. Cl.
CPC .............. *H02M 3/156* (2013.01); *H02M 3/02* (2013.01); *H02M 3/157* (2013.01); *H02M 5/42* (2013.01); *Y10T 307/707* (2015.04)

(58) Field of Classification Search
CPC ....... Y10S 323/906; G06F 11/30; H02M 3/02; H02M 3/156; H02M 3/157; H02M 5/42; Y10T 307/707
See application file for complete search history.

(56) References Cited

U.S. PATENT DOCUMENTS

| | | | |
|---|---|---|---|
| 5,982,156 A | 11/1999 | Weimer et al. | |
| 8,089,242 B2 * | 1/2012 | Loudot | .................. 320/101 |
| 8,531,055 B2 * | 9/2013 | Adest | ............... H01L 31/02021 |
| | | | 307/43 |
| 9,006,556 B2 * | 4/2015 | Bell et al. | .................. 136/205 |

(Continued)

FOREIGN PATENT DOCUMENTS

| | | |
|---|---|---|
| EP | 1905222 A2 | 4/2008 |
| JP | 2001037215 A | 2/2001 |
| WO | 2007010167 A2 | 1/2007 |

OTHER PUBLICATIONS

International Search Report mailed Jan. 2, 2012 in related International Application No. PCT/EP2011/051777.

(Continued)

*Primary Examiner* — Zeev V Kitov
(74) *Attorney, Agent, or Firm* — Patent Portfolio Builders PLLC

(57) ABSTRACT

Power system includes at least one power source and a DC/DC converter with an input coupled to the power source, and an output coupled to a load, for allowing power transfer from the power source to the load, the DC/DC converter including means for regulating an input voltage of the DC/DC converter.

11 Claims, 7 Drawing Sheets

(56) References Cited

U.S. PATENT DOCUMENTS

| | | | |
|---|---|---|---|
| 2004/0095020 A1* | 5/2004 | Kernahan | H02M 3/157 307/35 |
| 2004/0207366 A1 | 10/2004 | Sung | |
| 2006/0127710 A1* | 6/2006 | Schulte | H01M 8/04246 429/434 |
| 2008/0183338 A1 | 7/2008 | Kimball et al. | |
| 2009/0072779 A1 | 3/2009 | Kuhlmann | |
| 2009/0102430 A1 | 4/2009 | Marguery et al. | |
| 2009/0218983 A1* | 9/2009 | Loudot | H02J 7/0055 320/101 |
| 2009/0284998 A1 | 11/2009 | Zhang et al. | |
| 2010/0154858 A1* | 6/2010 | Jain | H01L 31/02021 136/244 |
| 2012/0047386 A1* | 2/2012 | Matsui | 713/340 |

OTHER PUBLICATIONS

Written Opinion mailed Jan. 2, 2012 in related International Application No. PCT/EP2011/051777.

* cited by examiner

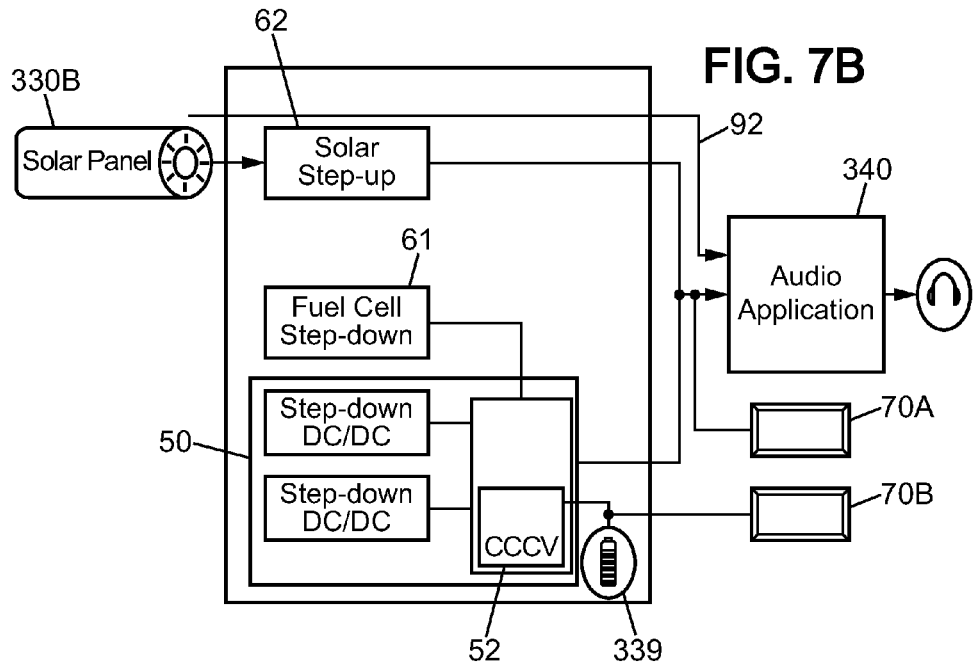
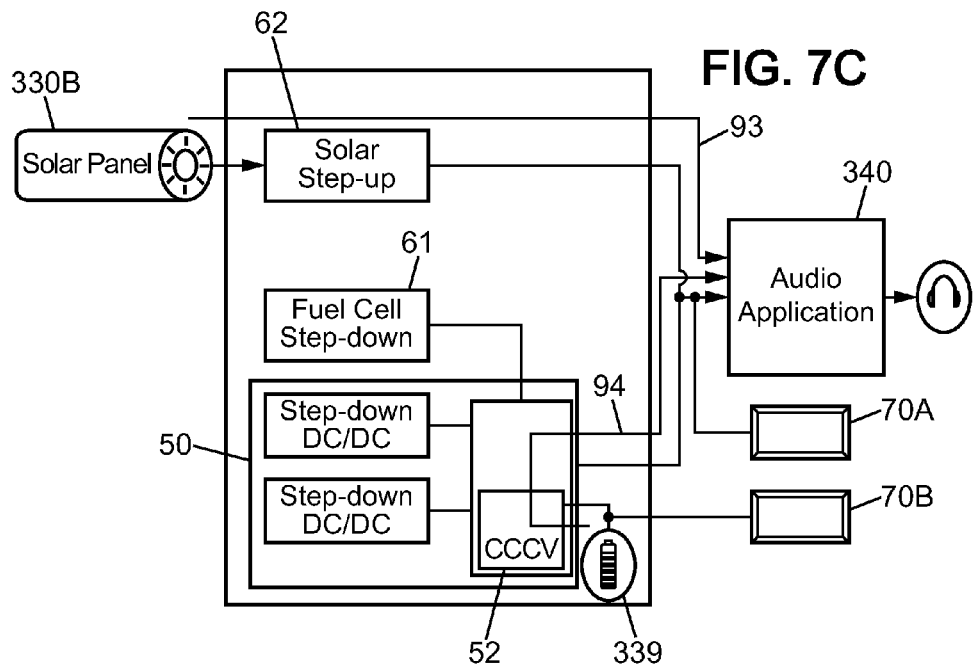

VOLTAGE REGULATION OF A DC/DC CONVERTER

RELATED AND PRIORITY APPLICATIONS

This application is a national stage application of International Application No. PCT/EP2011/051777 filed on 8 Feb. 2011. The international application claims priority from applications EP 10290070.1 (dated 12 Feb. 2010) and EP 10171796.5 (dated 3 Aug. 2010).

BACKGROUND

Technical Field

Embodiments of the invention generally rely on power systems for mobile devices, and more particularly to voltage regulation of a DC/DC converter suited for solar and thermal power management.

Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

As a classical DC/DC converter conventionally operates by regulating the output voltage, it does not allow keeping the power source such as a solar cell or a thermoelectric generator at the maximum power biasing point. This drastically decreases the power transmitted to the load such as a battery or an electronic function, and the overall power efficiency of the system comprised of the power source and the DC/DC converter.

Further, in case of charging a battery, not all the battery voltage range is covered.

Still further, addition of another power source managed by, for instance, an SMPS (Switch Mode Power Supply) with output voltage regulation to the current power management tree will generate conflicts with the existing power management circuits used to charge the battery or supply electronic functions. Stated otherwise, there will be conflict with another SMPS connected to the same output in the case of supplying an electronic function.

EP1905222 discloses a DC/DC voltage converter intended to connect a fuel cell to a filter capable of being connected to a battery of a mobile phone in a charge operation. The converter includes means for maintaining, during the charge operation, the voltage across the fuel cell at a given working voltage. However, a filter has to be connected between the DC/DC voltage converter and the battery for allowing the charge operation.

SUMMARY

A first aspect of the invention relates to a power system comprising at least one power source and a DC/DC converter with an input coupled to the power source, and an output which is configured to be coupled to a load for allowing power transfer from the power source to the load. The system comprises means for regulating an input voltage of the DC/DC converter.

Thanks to these provisions, the performances of the power source may be optimized, in particular if the power source is a solar cell or a thermoelectric generator.

The DC/DC converter may be a switch mode power supply DC/DC converter, the means for regulating an input voltage then comprising a control loop, a controller, a reference block, and a power switch, the controller being configured to compare feedback information of the control loop to data of the reference block and to regulate the input voltage of the DC/DC converter, based on the comparison, through the power switch.

The power source may comprise a solar cell. In this case, the controller may be configured to regulate the input voltage of the DC/DC converter based on levels of illumination by ambient light.

Alternately, the power source may comprise a thermoelectric generator. In this case the controller may be configured to regulate the input voltage of the DC/DC converter based on temperature gradient between hot and cold sources and absolute temperature values for hot and cold sources.

The load may comprise a battery to be charged and/or an electronic function to be powered and that may consume current.

In one embodiment, the DC/DC converter is a multi-DC/DC converter, with several inputs respectively coupled to several power sources. The power system then preferably comprises means for regulating each of the several input voltages of the multi-DC/DC converter.

A second aspect of the invention relates to a user equipment comprising a power system as describe above. The user equipment may be a cellular phone or other mobile device of that type, such as a smart phone.

A third aspect of the invention relates to a communication system comprising a plurality of such user equipments.

A fourth aspect of the invention relates to a method for managing a power system comprising at least one power source and a DC/DC converter with an input coupled to the power source, comprising:

coupling an output of the DC/DC converter to a load, for allowing power transfer from the power source to the load, and regulating an input voltage of the DC/DC converter.

In one embodiment, the DC/DC converter is a switch mode power supply DC/DC converter comprising a control loop, a controller, a reference block, and a power switch. The step of regulating an input voltage then preferably comprises comparing feedback information of the control loop to data of the reference block and regulating the input voltage of the DC/DC converter, based on the comparison, through the power switch.

The power source may comprises a solar cell, the method then comprising regulating the input voltage of the DC/DC converter based on levels of illumination by ambient light.

The power source may comprises a thermoelectric generator, the method then comprising regulating the input voltage of the DC/DC converter based on temperature gradient between hot and cold sources and absolute temperature values for hot and cold sources.

The DC/DC converter is a multi-DC/DC converter, with several inputs respectively coupled to several power sources. The method then comprises regulating each of the several input voltages of the multi-DC/DC converter.

BRIEF DESCRIPTION OF THE DRAWINGS

Embodiments of the invention are illustrated by way of example, and not by way of limitation, in the figures of the accompanying drawings, in which like reference numerals refer to similar elements and in which:

FIG. 6 and FIG. 7A to 7C are block diagrams of a demonstrator device which may be used to demonstrate the feasibility and advantages of embodiments of the present invention; and, FIG. 8 to FIG. 10 are charts which show the step up efficiency versus the input power, versus the input current and versus the output current, respectively, of the proposed solution.

DESCRIPTION OF PREFERRED EMBODIMENTS

There is disclosed herein solutions to a need which arises, in particular, for power systems comprising solar cells or thermoelectric generators as power sources. In what follows, the expression "PV Cell" refers to a photovoltaic cell, which is equivalent to a solar cell.

In order to optimize solar cells or thermoelectric generators performances, it is suitable to regulate their voltage at the biasing point where they can deliver maximum power. Due to a quasi-linear current to voltage characteristic for solar cells and thermoelectric generators near the regulated point, embodiments of the invention ensure a constant charge current through the voltage consign range.

The power source and its associated DC/DC converter with input voltage regulation are seen by the load as a current source. It simplifies its integration in the power tree and does not enter in conflict with an electronic function supply by another DC/DC converter (regulated on the output).

The power source may comprise at least one of solar cells and/or thermoelectric generators. The load can comprise a battery and/or an electronic function.

To optimize power efficiency of the overall system, power sources have to be connected in parallel rather than in series. The direct connection in parallel of solar cells or thermoelectric generators is not efficient due to the fact that power sharing will occur between the most powerful to the less one.

Embodiments of the invention rely on a multi-DC/DC architecture with input voltage regulation (each power is regulated at its maximum power capability) and concentrating all this power on a single load.

Input voltage regulation ensures optimum power efficiency during all the battery charging process, whatever being the battery voltage level. In addition, in the case where it supplies an electronic function, it will not enter in conflict with another SMPS used to supply this electronic function which is not the case with the classical DC/DC with output voltage regulation.

The power source (solar cells or thermoelectric generators) and its associated DC/DC converter with input voltage regulation are seen as a current source by the load (battery or electronic function) which simplifies the DC/DC integration in the power tree and does not enter in conflict with an other DC/DC converter (regulated on the output).

The proposed multi DC/DC architecture with input voltage regulation optimizes power efficiency of the overall system and reaches the maximum power from each source.

Figure 1:
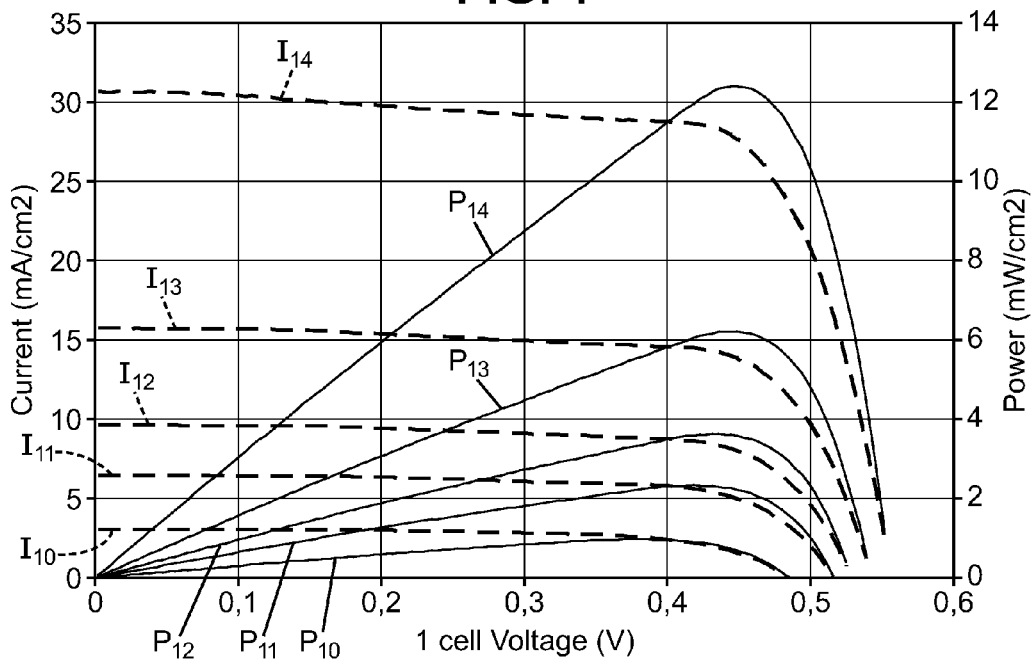
FIG. 1 shows solar cells characteristics, for various values of the sun voltage.

Referring to FIG. 1, there is shown therein solar cell characteristics, namely curves giving the current and power versus one cell voltage, for various values of the sun voltage.

Curves $I_{10}$, $I_{11}$, $I_{12}$, $I_{13}$ and $I_{14}$ are curves giving the current versus one cell voltage, for illumination by the ambient light corresponding to 0.1 sun, 0.2 sun, 0.3 sun, 0.5 sun, and 1 sun light intensity, respectively.

Curves $P_{10}$, $P_{11}$, $P_{12}$, $P_{13}$ and $P_{14}$ are curves giving the power versus one cell voltage, for the same illumination conditions as curves $I_{10}$, $I_{11}$, $I_{12}$, $I_{13}$ and $I_{14}$, respectively.

In the case of solar cells, curves $P_{10}$, $P_{11}$, $P_{12}$, $P_{13}$ and $P_{14}$ show that voltage corresponding to maximum power are lightly influenced by illumination level, so that a programmable input voltage regulator transfers the maximum power to the load. Indeed to strictly achieve the maximum performance whatever levels of illumination maximum power point tracking system can be integrated, for adapting the maximum power point to the illumination level.

Figure 2:
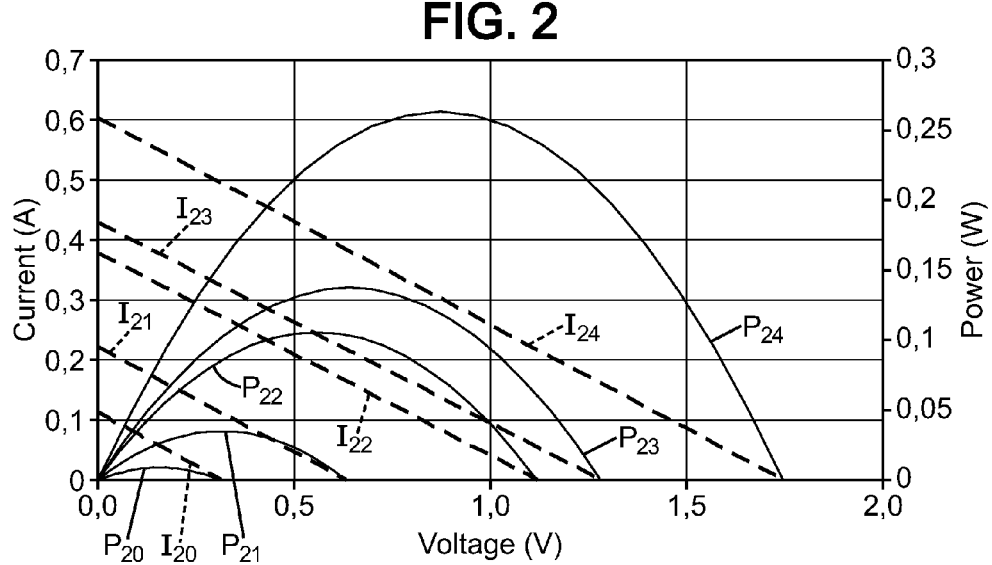
FIG. 2 shows thermo electrical generators characteristics, for various values of temperature gradient and absolute temperature values for hot and cold sources, respectively.

FIG. 2 gives thermo electrical generators characteristics, for various values of temperature gradient between hot and cold sources of the thermo electrical generators, and absolute temperature values for hot and cold sources, respectively.

Curve $I_{20}$ gives the current versus the voltage, for temperature gradient of 10°, absolute temperature value for hot source of 95°, and absolute value for cold source of 85°. Curve $I_{21}$ gives the current versus the voltage, for temperature gradient of 20°, absolute temperature value for hot source of 105°, and absolute value for cold source of 85°. Curve $I_{22}$ gives the current versus the voltage, for temperature gradient of 35°, absolute temperature value for hot source of 120°, and absolute value for cold source of 85°. Curve $I_{23}$ gives the current versus the voltage, for temperature gradient of 40°, absolute temperature value for hot source of 125°, and absolute value for cold source of 85°. Curve $I_{24}$ gives the current versus the voltage, for temperature gradient of 55°, absolute temperature value for hot source of 125°, and absolute value for cold source of 70°.

Curves $P_{20}$, $P_{21}$, $P_{22}$, $P_{23}$ and $P_{24}$ are curves giving the power versus the voltage, for the same temperature gradient and absolute temperature values as curves $I_{20}$, $I_{21}$, $I_{22}$, $I_{23}$ and $I_{24}$, respectively.

Figure 3:
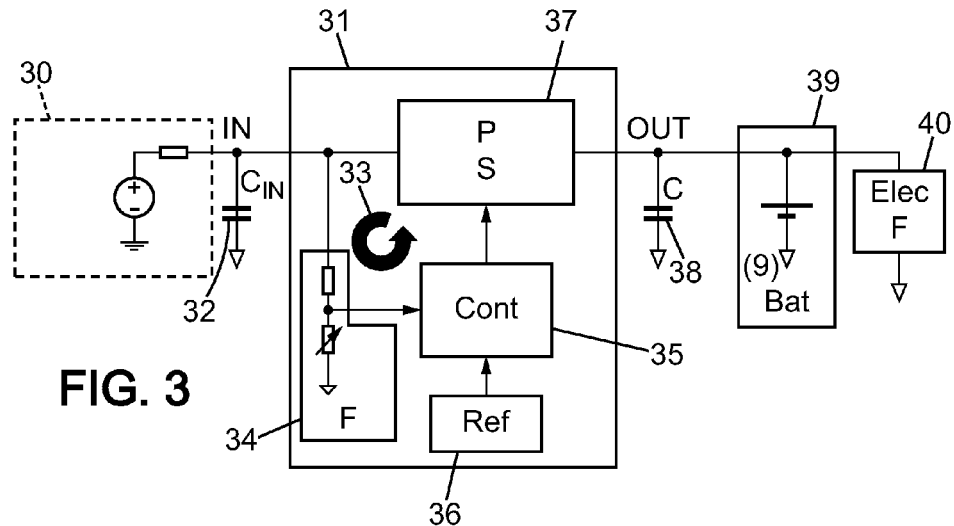
FIG. 3 is a schematic block diagram of a DC/DC converter comprising an input voltage regulation loop.

As can be seen on these curves, in the case of thermoelectric generators, waves representing power versus voltage show clearly a large dispersion of the voltage to achieve maximum power transfer depending on temperature gradient and absolute temperature values for hot and cold sources, so that a maximum power point tracking system should be added to input voltage regulation FIG. 3 is a block diagram of a DC/DC converter 31 comprising an input voltage regulation loop 33 according to embodiments of the present invention.

For example, the DC/DC power converter is a switch mode power supply DC/DC converter. The DC/DC converter may also be a linear DC/DC converter.

Input IN of the converter 31 is connected to a power source 30, comprising solar cells or thermoelectric generators. Output OUT of the converter 31 is connected to a load, comprising a battery 39 and/or an electronic function 40.

Depending on the number of solar cells or thermoelectric generators puts in series, the optimal working point corresponds to a step down, a step up or a step up-down architecture schematically shows in FIG. 3 by power switch 37 and controller 35.

To avoid any stress on the power source 30, a tank capacitor 32 may be inserted in parallel to it in order to provide high frequency energy required by the switching mode converter.

Power DC source 30 is coming from solar cell or thermoelectric generator.

Tank capacitor 32 is inserted in parallel to it so as to provide high frequency energy.

Input voltage is regulated by the mean of the control loop 33 comprising feedback 34. Feedback 34 is connected on input IN to assume input voltage regulation. The DC/DC power converter 31 comprises controller 35, reference 36 and power switch 37. Controller 35, by comparing feedback information to reference 36, generates the corresponding duty-cycle to the regulation point through power switch 37.

Output capacitor 38, connected on output OUT, ensures loop 33 stability and provides power peak consuming by electronic function 40 if the battery 39 is not connected.

Thus, should the battery 39 be mechanically disconnected from the converter circuit, then the control loop 33 will put automatically the system in low consumption mode without external control when no other load is connected on the output.

Figure 4:
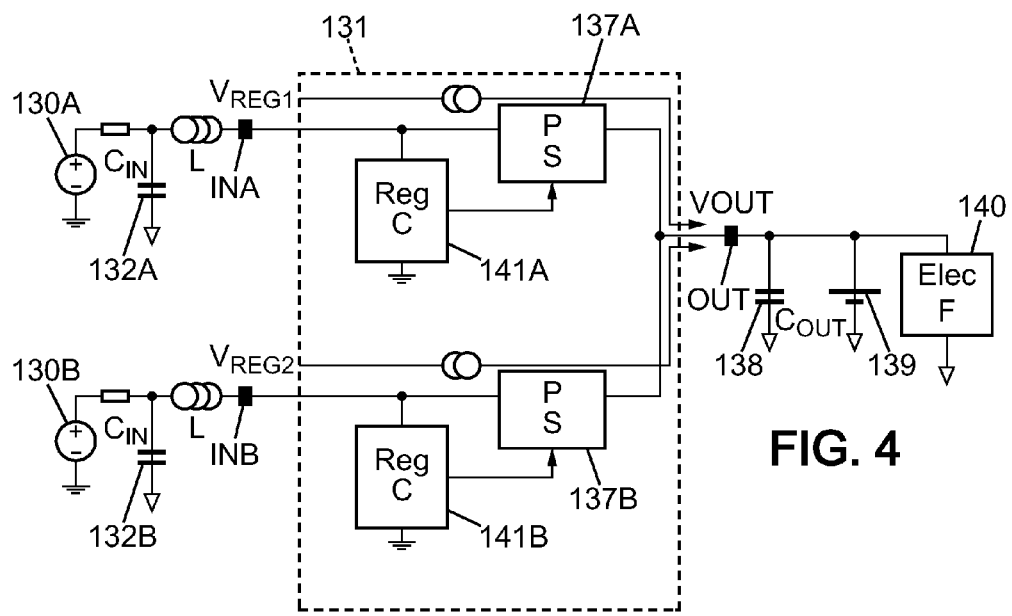
FIG. 4 is a schematic block diagram of a multi DC/DC converters system comprising input voltage regulation loops.

FIG. 4 is a block diagram of a multi-DC/DC power converter 131 controlling power sources 130A, 130B supplying a single battery 139 and/or an electronic function 140. The power sources 130A, 130B are solar cells or thermoelectric generators, for example two solar cells or two thermoelectric generators.

To avoid any stress on the power sources 130A, 130B, a tank capacitor 132A, 132B may be inserted in parallel to each of the power sources 130A, 130B in order to provide high frequency energy required by the switching mode converter 131.

Input voltage is regulated by input voltage regulation control blocks 141A, 141B, each of them regulating an input voltage on the corresponding input $IN_A$, $IN_B$ of the converter 131 by the mean of a control loop similar to control loop 33. Each voltage regulation control blocks 141A, 141B thus comprises feedback, controller and reference, as in FIG. 3. Feedback of a control loop is connected to corresponding input $IN_A$, $IN_B$ to assume input voltage regulation. Controller by comparing feedback information to reference generates the corresponding duty-cycle to the regulation point through corresponding power switch 137A, 137B.

Output capacitor 138, connected on output OUT, ensures loop stability and provides power peak consuming by electronic function 140 if the battery 139 is not connected.

The power sources 130A, 130B (solar cells or thermoelectric generators) and its associated DC/DC converter 131 with input voltage regulation is seen by the load (battery 139 and/or electronic function 140) as a current source.

Several branches can be put in parallel. Current on the load 139, 140 is then the sum of the currents from each branches, respectively. Without this multi-DC/DC converter 131, the parallel connection of solar panel or thermoelectric generator would not be so efficient due to a current sharing between most powerful devices to less powerful devices stemming from different equivalent impedance.

Figure 5:
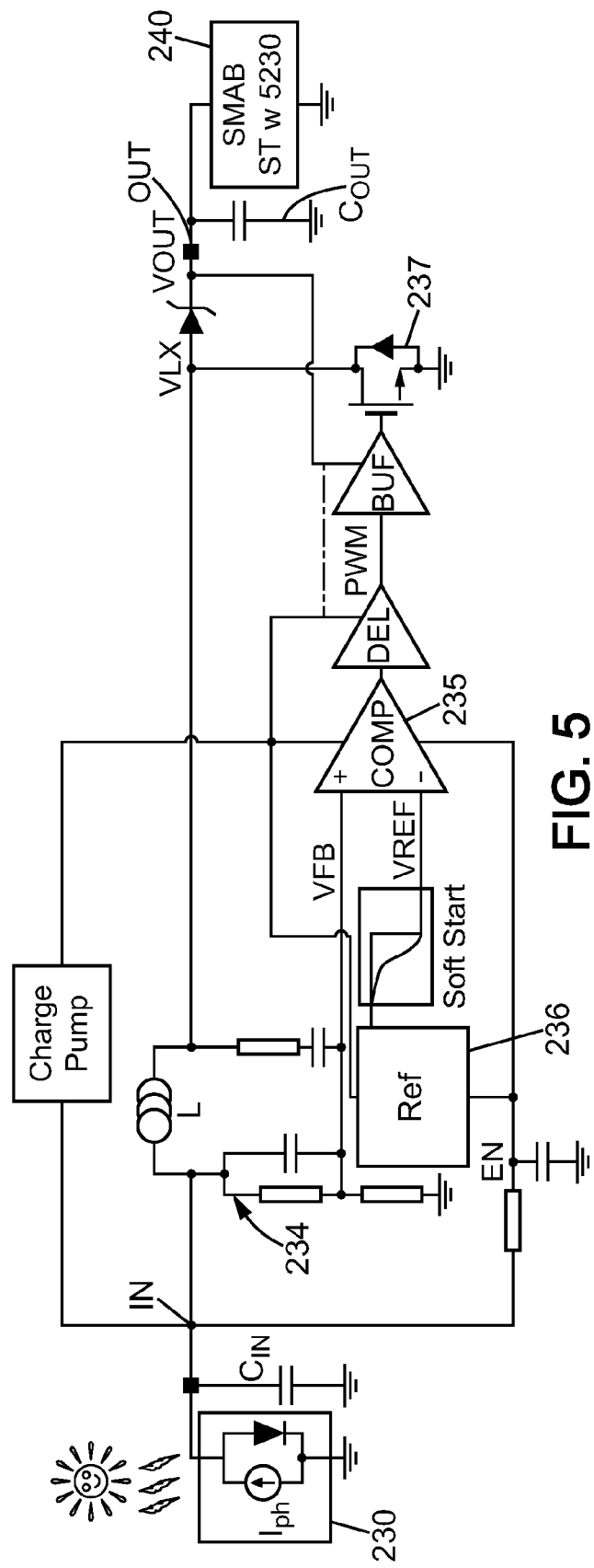
FIG. 5 is a block diagram of a step-up converter.

The block diagram of FIG. 5 illustrates an embodiment of an autonomous self powered DC/DC converter with dedicated scheme for start-up to go on lower PV cell voltage. The DC/DC converter comprises feedback 234, controller 235, reference 236 and power switch 237. Input IN of the DC/DC converter is connected to power source 230, which is a solar cell or a thermo electric generator. Output OUT of the DC/DC converter is connected to a load 240.

Figure 6:
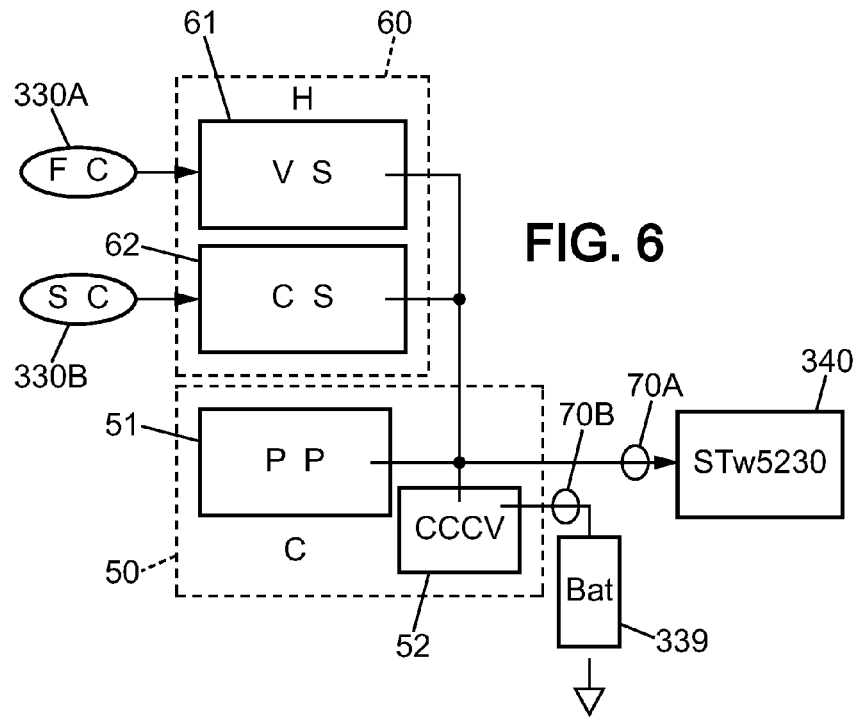

FIG. 6 illustrates the general architecture of a demonstrator which can be used to demonstrate the feasibility and advantages of the proposed solution in the context of a power hub. This architecture is based on two chips, called COMPASS chip 50 and HARVEST chip 60, respectively.

The HARVEST chip 60 comprises a step-down Voltage Source 61 suitable for fuel cells 330A of 3.6V/1A for instance, and a step-up Current Source 62 suitable for solar cells 330B of 2.8V/5 mA for instance.

The COMPASS chip 50 comprises a power path 51 and a Constant Current/Constant Voltage (CCCV) charger 52. The COMPASS chip 50 is connected to a battery 339 and to an electronic function 340, for example a SMAB device, which is an audio device. The COMPASS chip 50 is able to load the battery 339 when the power is sufficient, and to unload the battery 339 if necessary.

Ampere meters 70A, 70B are connected between the demonstrator and the battery 339 and between the demonstrator and the electronic function 340, respectively.

The demonstrator may be realized based on HCMOS9A technology. It may comprise a 1.5 A step-down converter for fuel cells and a 150 mA step-up converter for solar cells, as well a state machine and an I2C bus to control/supply a SMAB device (like a STw5230 circuit of STMicroelectronics).

Figure 7A:
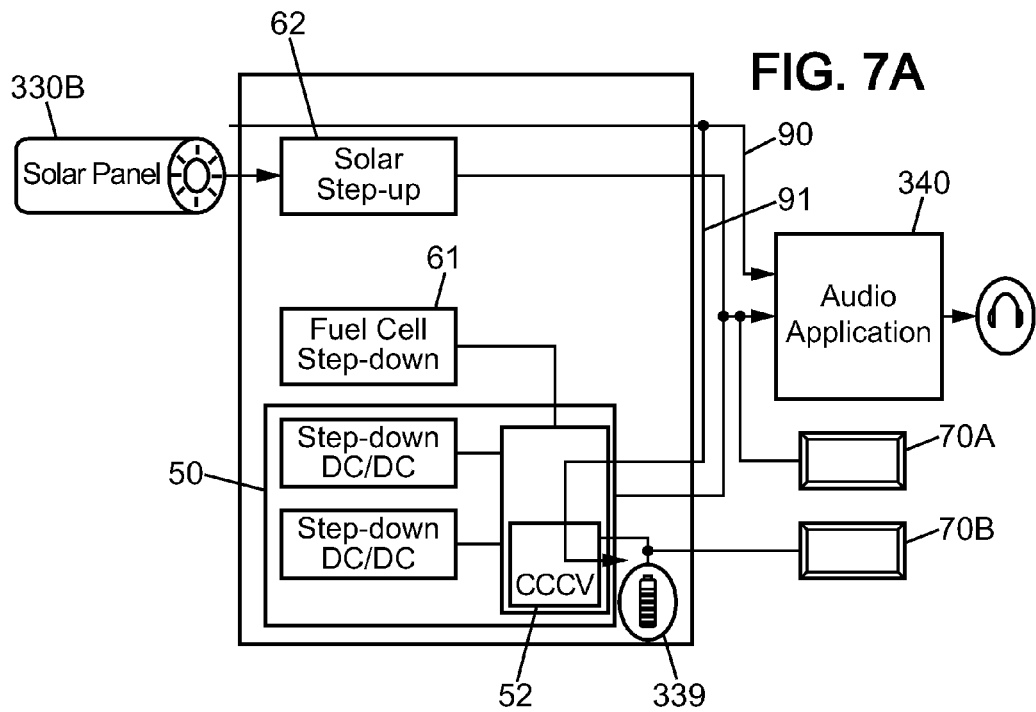

FIG. 7A to 7C show more details of a possible architecture of the power hub demonstrator of FIG. 6.

In FIG. 7A, the solar power is superior to the consumption by the load. In this case, the power provided by the solar cells 330B is sufficient to feed the audio application 340 (arrow 90) and to load, through the charger 52, the battery 339 (arrow 91).

In FIG. 7B, the solar power is equal to the consumption by the load. In this case, all the power provided by the solar cells 330B is used to feed the audio application 340 (arrow 92).

In FIG. 7C, the solar power is inferior to the consumption by the load. In this case, all the power provided by the solar cells 330B is used to feed the audio application 340 (arrow 93) and the charger 52 unloads the battery 337 to complete the supply of the application 340 (arrow 94).

Figure 8:
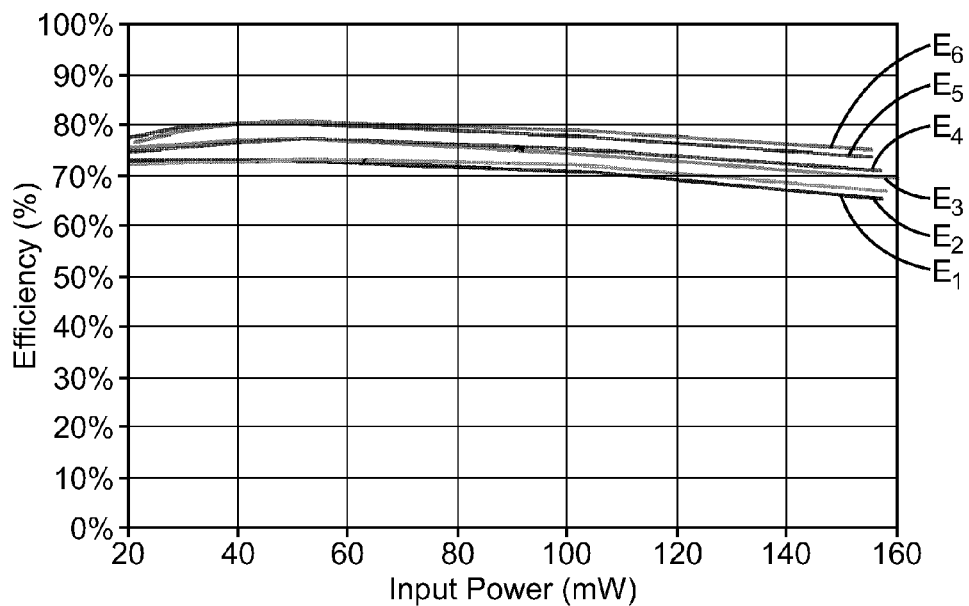
Figure 9:
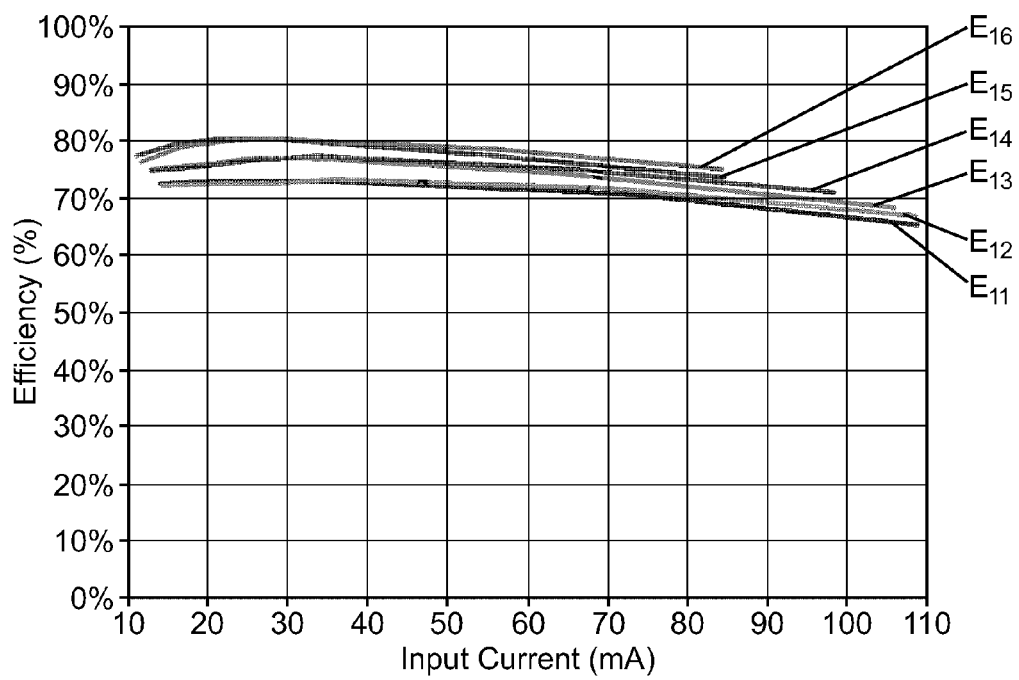
Figure 10:
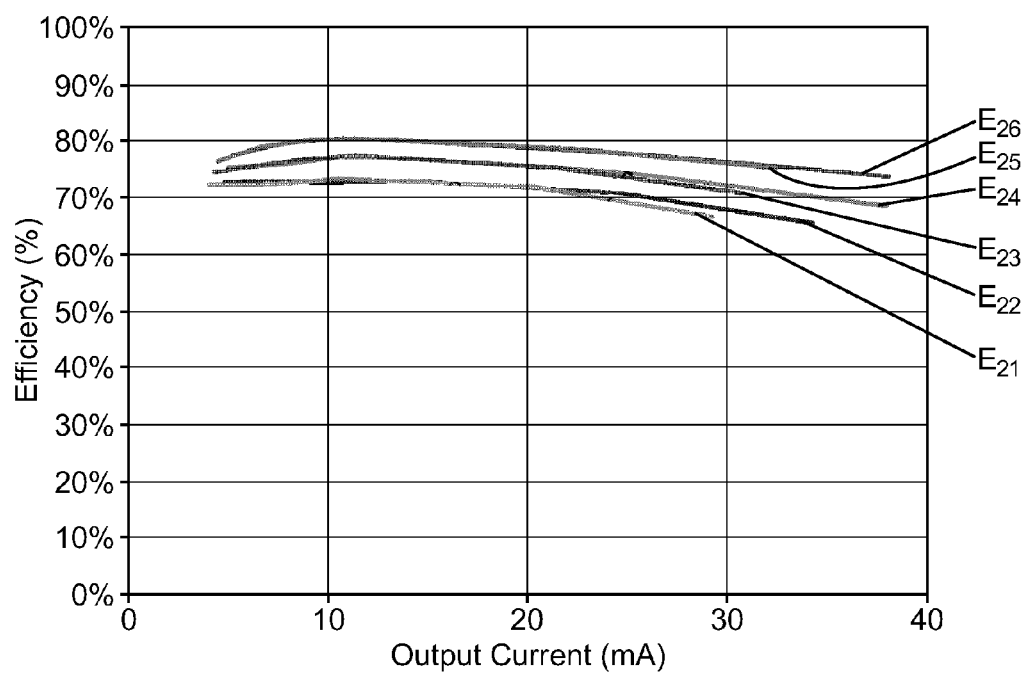

FIG. 8, FIG. 9 and FIG. 10 are charts which illustrate the Step up efficiency versus the input power, versus the input current and versus the output current, respectively, for various values of the input voltage Vin and of the output voltage Vout.

In FIG. 8, curve $E_1$ gives the efficiency versus input power, for input voltage value of 1.4V and output voltage value of 3V. Curve $E_2$ gives the efficiency versus input power, for input voltage value of 1.4V and output voltage value of 3.6V. Curve $E_3$ gives the efficiency versus input power, for input voltage value of 1.55V and output voltage value of 3V. Curve $E_4$ gives the efficiency versus input power, for input voltage value of 1.55V and output voltage value of 3.6V. Curve $E_5$ gives the efficiency versus input power, for input voltage value of 1.8V and output voltage value of 3V. Curve $E_6$ gives the efficiency versus input power, for input voltage value of 1.8V and output voltage value of 3.6V.

Curves $E_{11}$, $E_{12}$, $E_{13}$, $E_{14}$ and $E_{15}$ of FIG. 9 are curves giving efficiency versus the input current for the same values of the input voltage and of the output voltage as curves $E_1$, $E_2$, $E_3$, $E_4$ and $E_5$, respectively.

Curves $E_{21}$, $E_{22}$, $E_{23}$, $E_{24}$ and $E_{25}$ of FIG. 10 are curves giving efficiency versus the output current for the same values of the input voltage and of the output voltage as curves $E_1$, $E_2$, $E_3$, $E_4$ and $E_5$, respectively.

Embodiments of the hysteretic control which has been described above include at least some of the following advantages: a relative simple architecture, no loop compensation needed, no error amplifier needed, no ramp, relatively self stabilized architecture, fast response in load transient, and characteristics (voltage, current) relatively independent from spread of components.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. Power system comprising
   a plurality of power sources, each of the plurality of power sources being a same type of power source;
   a separate capacitor connected in parallel with each of the plurality of power sources; and
   a DC/DC converter comprising
      a separate input coupled to each of the plurality of power sources,
      a separate input voltage regulation circuit coupled to each of the separate inputs, wherein each input voltage regulation circuit comprises
         a comparator configured to compare a voltage of the separate input with a reference voltage; and
         a switch comprising a transistor coupled in parallel with a diode, wherein the switch is coupled to receive an output of the comparator;
         a charge pump coupled to the separate input and arranged to augment a voltage received from the separate input and to provide the augmented voltage to the comparator as a power supply of the comparator; and
      an output of the DC/DC converter, wherein the output of the DC/DC converter is coupled to the switch of each separate input voltage regulation circuit and coupled to a load for allowing power transfer from the plurality of power sources to the load.

2. Power system according to claim 1, wherein the plurality of power sources are solar cells.

3. Power system according to claim 1, wherein each voltage regulation controller is configured to regulate the input voltage of one of the plurality of power sources based on levels of illumination by ambient light.

4. Power system according to claim 1, wherein the plurality of power sources are thermoelectric generators.

5. Power system according to claim 1, wherein each voltage regulation controller is configured to regulate the input voltage of one of the plurality of power sources based on temperature gradient between hot and cold sources and absolute temperature values for hot and cold sources.

6. Power system according to claim 1, wherein the load comprises a battery and/or an electronic function.

7. User equipment comprising:
   a load;
   a plurality of power sources, each of the plurality of power sources being a same type of power source;
   a separate capacitor connected in parallel with each of the plurality of power sources; and
   a DC/DC converter comprising
      a separate input coupled to each of the plurality of power sources,
      a separate input voltage regulation circuit coupled to each of the separate inputs, wherein each input voltage regulation circuit comprises
         a comparator configured to compare a voltage of the separate input with a reference voltage; and
         a switch comprising a transistor coupled in parallel with a diode, wherein the switch is coupled to receive an output of the comparator;
         a charge pump coupled to the separate input and arranged to augment a voltage received from the separate input and to provide the augmented voltage to the comparator as a power supply of the comparator; and
      an output of the DC/DC converter, wherein the output of the DC/DC converter is coupled to the switch of each separate input voltage regulation circuit and coupled to the load for allowing power transfer from the plurality of power sources to the load.

8. Power system according to claim 2, wherein each voltage regulation controller is configured to regulate the input voltage of one of the plurality of power sources based on levels of illumination by ambient light.

9. Power system according to claim 4, wherein each voltage regulation controller is configured to regulate the input voltage of one of the plurality of power sources based on temperature gradient between hot and cold sources and absolute temperature values for hot and cold sources.

10. Power system according to claim 1, wherein each of the plurality of power sources is connected in parallel with the other of the plurality of power sources.

11. User equipment according to claim 7, wherein each of the plurality of power sources is connected in parallel with the other of the plurality of power sources.

* * * * *